United States Patent [19]

Baker et al.

[11] 4,041,757
[45] Aug. 16, 1977

[54] FLUID FLOWMETER

[75] Inventors: William C. Baker, Hampton; John J. Chapman, Virginia Beach, both of Va.

[73] Assignee: Teledyne, Inc., Los Angeles, Calif.

[21] Appl. No.: 645,454

[22] Filed: Dec. 30, 1975

[51] Int. Cl.[2] .......................... G01F 1/68; G01F 5/00
[52] U.S. Cl. ......................................... 73/202; 73/204
[58] Field of Search .................................. 73/204, 202

[56] References Cited

U.S. PATENT DOCUMENTS

| 2,446,283 | 8/1948 | Hulsberg | 73/204 |
|---|---|---|---|
| 2,729,976 | 1/1956 | Laub | 73/204 |
| 2,994,222 | 8/1961 | Laub | 73/204 |
| 3,443,434 | 5/1969 | Baker et al. | 73/204 |
| 3,559,482 | 2/1971 | Baker et al. | 73/204 |

Primary Examiner—Herbert Goldstein
Attorney, Agent, or Firm—Cushman, Darby & Cushman

[57] ABSTRACT

Apparatus for measuring the flow of fluid through a main supply line having a restrictive element therein to develop a pressure drop. A shunt fluid flow path bypasses this element. The shunt path includes a conduit having a first electrically heated portion and an unheated portion, each portion respectively having a temperature sensing device associated therewith. Means are provided for varying the voltage supplied to an electrical heater for the first conduit portion to maintain a constant temperature difference between the temperature sensing devices, the amount of voltage supplied being a function of the characteristics of fluid flow through the main supply line.

8 Claims, 4 Drawing Figures

FLUID FLOWMETER

BACKGROUND OF THE INVENTION

The present invention is an improvement over the flow measuring apparatus disclosed in U.S. Pat. No. 3,433,434-William C. Baker et al — which was issued on May 13, 1969. More particularly, the aforesaid patent relates to an arrangement wherein a portion of the fluid streaming through a main supply line is diverted in a shunt path by a conduit which is electrically heated from a constant power source. A thermoelectric device is associated with the conduit, and the temperature sensed by the thermoelectric device is used to provide an indication of the flow through the shunt path and the main supply line.

The relationship that exists between fluid flow and the variables encountered in a temperature sensing arrangement for measuring fluid flow is given by the formula:

$$M \sim (H/C_p \Delta t)$$

where $M$ is the mass flowrate, $H$ is the heat input per unit time, $C_p$ is the heat capacity of the fluid at constant pressure and $\Delta t$ is the temperature differential between the temperature detected by a sensing device responsive to the fluid flow and a reference temperature, such as that of a heat sink.

The heat capacity term $C_p$ cannot indiscriminately be considered a constant since it varies with fluid composition, temperature and pressure. In most fluids the variation with pressure is small and can be neglected. However, the variation with temperature can be quite large for some fluids.

The $C_p$ for carbon dioxide, for example, varies 19.5% for a 200° C. change, and such a variation is typical of the variations of the operating temperatures of some constant power flowmeters. Therefore, the accuracy of flow measurement is adversely affected by variations of $C_p$ encountered with such a flowmeter.

Furthermore, in constant power type flowmeters a relatively large temperature change must be detected to provide good sensitivity. A typical constant power flowmeter using thermocouples to sense temperature requires a 213° C. temperature differential for a 10 mvdc output.

By comparison, when operating a flowmeter in a constant temperature mode as contemplated by the present invention, variations in $C_p$ due to flow are substantially eliminated and $C_p$ is relatively constant for any given fluid. Additionally, it is only necessary to develop a temperature differential of sufficient magnitude to provide a stable error signal capable of maintaining the differential constant. As a result, the constant temperature flowmeter operates with improved accuracy, increased range, reduced operating temperature and improved response time.

SUMMARY OF THE INVENTION

Briefly, the invention comprises a main supply line carrying the fluid, the flow characteristics of which are to be measured. A restrictive head element is provided in the main line to develop a differential pressure in the line. An external shunt line, or bypass, is connected to the main supply line to divert a portion of the fluid through the shunt from the high pressure side of the head element to the low pressure side. A constant temperature flowmeter is associated with the shunt line, the flowmeter including a conduit having a first electrically heat portion and an unheated portion, each portion having a thermoelectric device associated therewith to sense the temperature at the locations of the devices. The outputs of the thermoelectric devices are applied to circuitry which responds to the temperature differential detected by the devices so as to control the voltage applied to the electrical heater thereby maintaining the temperature differential constant. The voltage required to accomplish this is a function of the fluid flow characteristics of the system.

The invention will become more fully apparent when considered in light of the following detailed description of illustrative embodiments of the invention and from the appended claims.

The illustrative embodiments may be best understood by reference to the accompanying drawings, wherein.

Figure 1:
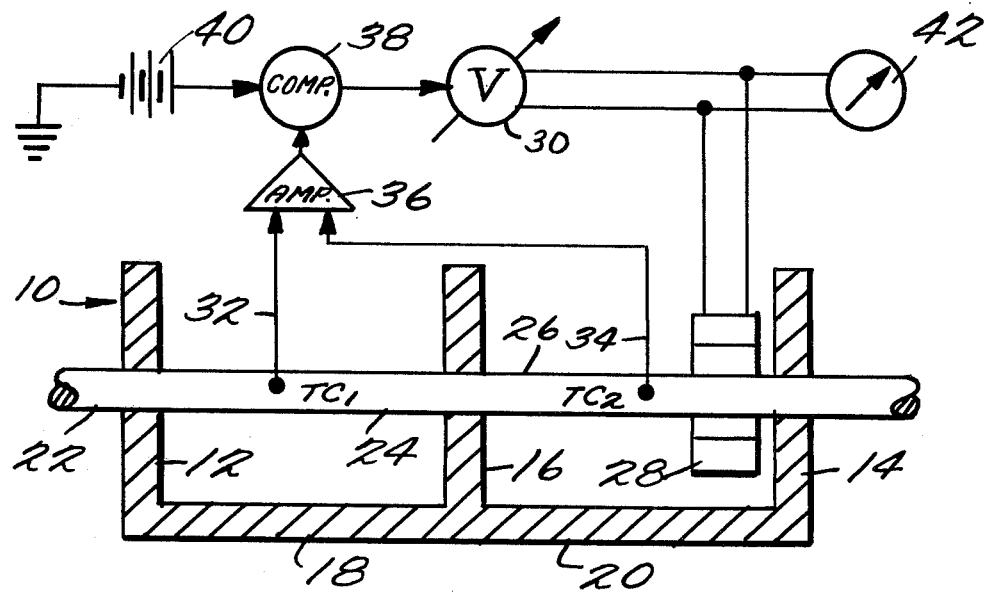
FIG. 1 is a schematic drawing, partially in section, illustrating a typical constant temperature flow sensor which may be used in practicing the present invention.

Referring first to FIG. 1, a constant temperature flow sensor 10 is illustrated which is suitable for use with the several embodiments of the invention disclosed herein. The sensor comprises an electrically and thermally conductive heat sink having end walls 12 and 14, a partition 16, and bottom portions 18 and 20 which connect the partition 16 with the end walls 12 and 14, respectively. A conduit 22 passes through the end walls and the partition in contacting relationship therewith, the partition dividing the conduit into portions 24 and 26. Conduit portions 24 and 26 are thermally conductive, and at least conduit portion 26 is electrically conductive. Power is inductively coupled in conduit portion 26 by a wound toroid 28 energized by a variable voltage source 30. When toroid 28 is energized, the loop comprising conduit portion 26, end wall 14, bottom portion 20 and partition 16 permits a current flow thereby heating conduit portion 26. A first thermocouple TC-1 is formed at the junction of the unheated portion 24 of conduit 22 and an attached conductor 32 of a dissimilar material. A second thermocouple TC-2 is formed at the junction of the heated conduit portion 26 and an attached conductor 34 of a dissimilar material. The outputs of thermocouples TC-1 and TC-2 are coupled by conductors 32 and 34, respectively, to a differential amplifier 36. The output of the amplifier is joined to a comparator 38 as is a fixed reference voltage source 40. The comparator output is a control signal which is connected as an input to the variable voltage source 30. An indicator 42 is controlled by the output of source 30 to develop a reading which is a function of the voltage produced by source 30.

In operation, reference 40 is set to produce an output from source 30 sufficient to heat conduit portion 26 via toroid 28 by an amount sufficient to create a desired temperature differential $\Delta t$ between the locations of TC-1 and TC-2. Any variation in $\Delta t$ causes the differential amplifier output to vary thereby altering the output of comparator 38. This in turn adjusts the voltage output of source 30 so as to change the amount of electrical heating of conduit portion 26 until the predetermined $\Delta t$ is reached. The indicator 42 provides an indication which is a function of the voltage necessary to restore $\Delta t$ to its desired constant value.

Figure 2:
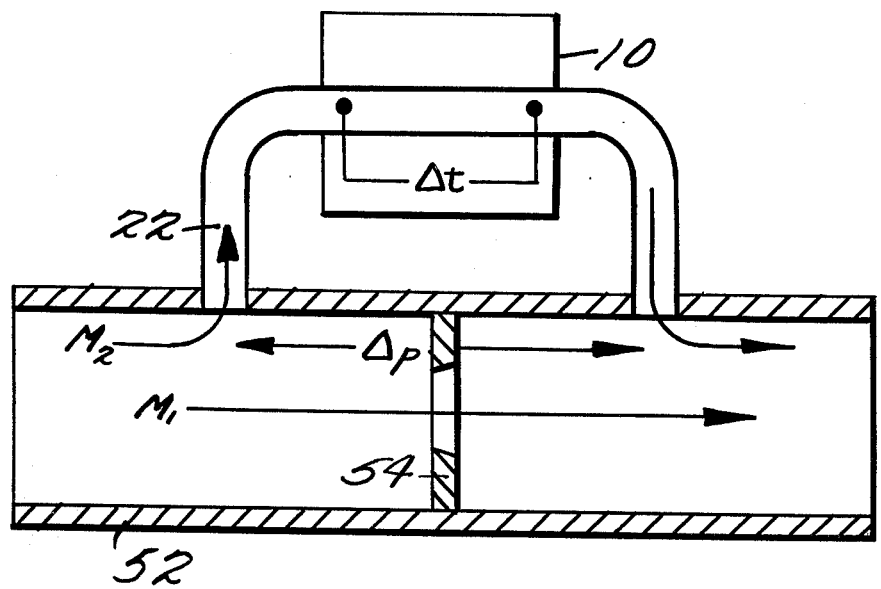
FIG. 2 is a schematic drawing, partially in section, illustrating a first embodiment of the invention.

Referring now to FIG. 2 a first embodiment of the invention will be described. Within a main supply line 52 fluid moves on the direction indicated by the arrowheads. The main flow is represented by $M_1$. A primary restrictive element 54 is positioned in the supply line to develop a differential pressure $\Delta p$, across the element which is proportional to the square of the flow $m_1$ through it. Element 54 may take many forms such as an orifice plate, a flow nozzle, a venturi nozzle, etc. The same differential pressure exists across a shunt line, or bypass 22, and causes a flow $M_2$ therethrough. The by-pass is sized to limit the flow to a small fraction of the main flow $M_1$ and to insure that it is essentially laminar throughout its intended range. Under these conditions the by-pass flow $M_2$ is directly proportional to the differential pressure $\Delta p$, across element 54 and therefore proportional to the square of the main flow $M_1$.

A constant temperature flow sensor is included in the shunt path. As indicated previously in the discussion of the formula:

$$M \sim (H/Cp\, \Delta t)$$

the mass flow through a heated tube type of flow sensor is directly proportional to the heat input per unit time (H) into the tube, and inversely proportional to the heat capacity of the fluid (Cp) and to the temperature differential in the fluid as it passes through the heated tube ($\Delta t$). The heat input is proportional to the electrical power supplied to the tube, which is proportional to the square of the applied voltage ($E^2/R$). With the temperature differential held constant, and the heat capacity of the fluid and the electrical resistance of the heated tube being substantially constant, the mass flowrate is proportional to the square of the applied voltage. The flow $M_2$ in the by-pass is measured by the constant temperature flow sensor and thus is proportional to the square of the voltage applied to the heater portion of sensor 10. Since flow $M_2$ is also proportional to the square of the main flow $M_1$, the heater voltage squared is also proportional to the square of the main flow $M_1$. Thus, the heater voltage is directly proportional to the flow $M_1$ in the main supply line 52.

Figure 3:
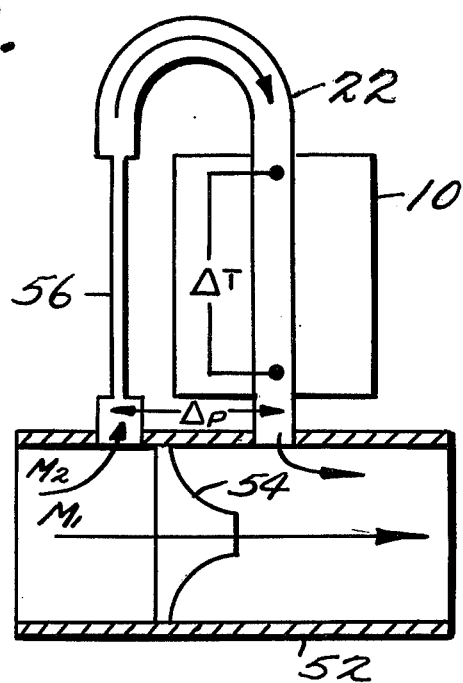
FIG. 3 is a schematic drawing, partially in section, illustrating a second embodiment of the invention.

A second embodiment of the invention illustrated in FIG. 3 differs from the preceding embodiment by including in the shunt line 22 a second restrictive element 56. The purposes of element 56 are (1) to match the pressure drop $\Delta p$ across the by-pass at the rated flow of the constant temperature flow sensor 10 to that across the primary restrictive element 54 at its rated flow and (2) to insure that flow through the by-pass varies directly with the pressure differential. Again, the heater voltage is proportional to the flow in the main supply line 52.

Figure 4:
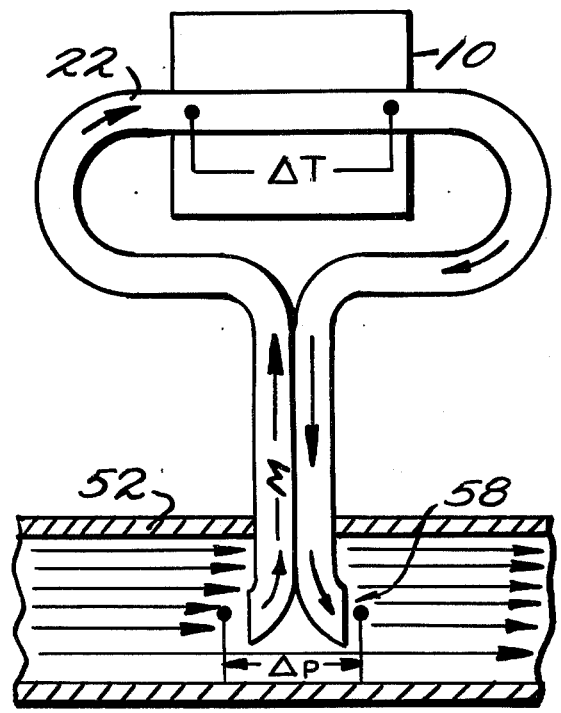
FIG. 4 is a schematic drawing, partially in section, illustrating a third embodiment of the invention.

A third embodiment of the invention is shown in FIG. 4. In this case the primary restrictive element is a pitot tube 58. The pressure drop $\Delta p$ across the tip of the pitot is proportional to the square of the velocity of the fluid passing the pitot tube. The pressure differential $\Delta p$ causes a small flow M through the conduit 22 of the constant temperature flow sensor connected across the pitot tube. With laminar flow through conduit 22, the flow is proportional to the pressure differential $\Delta p$. The square of the voltage applied to the heater portion of sensor 10 is also proportional to the flow M. Therefore, the voltage applied to the heater is directly proportional to the velocity of the fluid past the pitot.

What is claimed is:

1. Apparatus for measuring fluid flow through a main supply line, comprising:
    a. a restrictive element within said main line for developing a differential pressure proportional to the square of the velocity of the fluid;
    b. a shunt line connected to the main line to divert fluid from the main line at the higher pressure side of the element and to return the fluid to the main line at the lower pressure side of the element, said shunt line having a pressure drop thereacross which is proportional to the first power of the velocity of the fluid passing through said shunt line;
    c. a thermal connected in said shunt line, said flow meter including:
        1. a conduit through which the diverted fluid passes;
        2. means at spaced locations along the exterior of said conduit for sensing the temperature of the conduit at said locations and for producing output signals representative of the temperatures sensed;
        3. means for heating a first portion of said conduit containing a first one of said temperature sensing means;
        4. means for preventing a second portion of said conduit from being heated when said first portion is heated, said second conduit portion containing a second one of said temperature sensing means;
        5. means responsive to the output signals produced by the temperature sensing means for varying voltage supplied to said heating means in order to maintain a constant difference in temperature between said first and second temperature sensing means; and
        6. indicating means responsive to the first power of the voltage supplied to said heating means to thereby provide a representation which is a function of the flow rate through said main supply line.

2. Apparatus as set forth in claim 1, wherein each of said temperature sensing means comprises a thermocouple.

3. Apparatus as set forth in claim 1, wherein said restrictive element is an orifice plate.

4. Apparatus as set forth in claim 1, wherein said restrictive element is a pitot tube.

5. Apparatus as set forth in claim 1, wherein said restrictive element is a venturi device.

6. Apparatus as set forth in claim 1 wherein the means for varying voltage supplied to the heating means comprises:
    1. a variable voltage supply; and
    2. means responsive to the difference between the output signals produced by said first and second temperature sensing means for controlling said voltage supply.

7. Apparatus as set forth in claim 6, wherein said means responsive to the difference between the output signals includes:
    1. a differential amplifier to which the output signals are connected as inputs;
    2. a comparator joined to the differential amplifier for comparing the output of the amplifier with a voltage from a fixed reference source to produce a control signal at the output of the comparator; and 3. means for coupling said control signal to the variable voltage supply.

8. Apparatus as set forth in claim 1 further comprising:
an additional restrictive element, said additional element being located within the shunt line and having a pressure drop thereacross which is proportional to the first power of the velocity of the fluid passing through the additional element.

* * * * *